Patented Apr. 9, 1940

2,196,579

UNITED STATES PATENT OFFICE 2,196,579

POLYMERIC VINYLIDENE CHLORIDE COMPOSITIONS

Robert C. Reinhardt, Midland, Mich., assignor to The Dow Chemical Company, Midland, Mich., a corporation of Michigan No Drawing. Application October 6, 1937,
Serial No. 167,638

4 Claims. (Cl. 260—41)

This invention relates to compositions and methods for bonding metal surfaces to polymeric products derived from vinylidene chloride.

It is an object of the present invention to provide a method whereby a polymer or co-polymer of vinylidene chloride may be firmly bonded to a metal surface. It is a further object to provide a composition of matter suitable for use as an adhesive or bonding agent between a metal surface and a sheet of polymeric or co-polymeric vinylidene chloride.

I have discovered that vinylidene chloride polymers and co-polymers may be caused to adhere permanently to clean metal surfaces if a mineral or vegetable fibrous material is first incorporated with the polymer and the fiber-filled mass is applied to the metal surface by the use of heat and pressure, whereas the polymers themselves show little or no adhesion to the metal when subjected to similar treatment. Such fibers are non-thermoplastic and undergo no chemical change when mixed with the polymer and subjected to the subsequent treatment for coating the metal. The fibrous material may be mixed mechanically with the powdered solid polymer, and the mixture blended into a plastic mass by milling or masticating with a suitable volatile liquid menstruum, which is then removed by vaporization. Another procedure is to stir the fibrous material into a liquid solution or dispersion of the polymer in a volatile medium, and then vaporizing off the medium. The amount of such fibrous material which may suitably be employed in the composition is between about 0.05 and about 2.0 parts by weight thereof per part of the polymeric vinylidene chloride. For many purposes a very satisfactory composition contains equal parts of the fibrous material and of the polymer. If desired, small amounts of plasticizers or heat-stabilizing agents may be incorporated in the bonding composition. As an example of a specific composition which has been found to be very satisfactory as a bonding agent, approximately equal quantities by weight of asbestos fiber and of a powdered vinylidene chloride-vinyl chloride co-polymer (wherein the vinylidene chloride was the predominant co-polymerized constituent) are mixed together, an amount of phenoxy-propylene oxide equal to 3 per cent of the combined weight of asbestos and the co-polymer being added as a plasticizer. In preparing the composition the phenoxy-propylene oxide is dissolved in approximately 30 times its weight of acetone and this solution poured over the mixture of asbestos and the vinylidene chloride co-polymer. The entire mass is thoroughly masticated, after which the acetone is removed by evaporation.

For applying the bonding compositions to metal surfaces, they are conveniently supplied in the form of sheets. Pellets are formed from the fiber-containing polymeric compositions in a pellet press, and the pellets pressed or rolled into thin sheets, suitably in a heated die lubricated with calcium or sodium stearate. The metal surface to be coated with the bonding composition should be substantially free from grease, rust, scale, and the like, which serve to prevent adhesion between the polymeric product and the metal. The metal surface is heated preferably to a temperature between about 130° and about 170° C., and a sheet of the fiber-containing polymer composition laid thereover. Pressure is applied to compress the bonding composition against the metal, while maintaining the temperature in the aforesaid range of about 130° to about 170° C. Such pressure may vary from about 1000 pounds to about 5000 pounds per square inch depending upon the nature of the polymeric product, the fibers therein, and the metal surface. The pressure is ordinarily maintained for a period between about 30 seconds and about 5 minutes, after which the bonded article is cooled, the pressure released, and the article ejected from the die.

The following examples illustrate various methods of bonding the vinylidene chloride polymers or co-polymers to metals.

Example 1

A clean piece of steel was heated to 170° C. and placed in a die with a sheet of the vinylidene chloride co-polymer-asbestos composition described above. These materials were heated in the die to 170° C. for approximately 30 seconds. Pressure was then applied to the extent of about 1000 pounds per square inch, the pressure on the die being maintained for about 2 minutes, providing an opportunity for the polymeric composition to become well cured. The die was cooled in the course of about a minute, the pressure thereon was released, and the metal sheet, to which the co-polymeric vinylidene chloride product now adhered, was ejected. The sheet could be bent, hammered, subjected to rapid changes in temperature, as well as to the action of chemicals and common organic solvents without affecting the adhesion of the coating deposited on the metal.

Example 2

A clean piece of brass was heated to 170° C. and placed in a die. One surface of the metal was covered with a sheet of the composition employed in the previous example. Above this sheet was placed another molded sheet of the same vinylidene chloride-vinyl chloride co-polymer without, however, any asbestos or other fibrous material mixed therein. The metal and the two sheets of polymeric product were subjected to the same steps of heating, compressing, curing, cooling, and ejection as described in the preceding example. The product was a laminated article having a vinylidene chloride-vinyl chloride co-polymer on the outside joined to the brass by the intermediate asbestos-containing composition. This product could also withstand hammering, bending, and other similar physical stresses, as well as the attack of chemical and solvent agents, without losing any of the adhesion between the polymeric vinylidene chloride layer and the metal.

Co-polymers of vinylidene chloride with such materials as vinyl acetate, styrene, methyl and ethyl acrylate, methyl methacrylate, divinyl ether, and the like, to which have been added such fibers as asbestos, short staple cotton, hemp, sisal, or other non-thermoplastic fibers, may be caused to adhere to such metal surfaces as iron, steel, stainless steel, nickel, copper, "Monel," brass, and the like, in a manner similar to that described above. When laminated products are being prepared the bonding composition which is applied directly to the metal surface may contain the same or a different polymeric product from that employed as the outer lamination. For example, if the fiber-containing bonding composition has been prepared from vinylidene chloride-vinyl acetate co-polymers, the outer layer may be pure polymeric vinylidene chloride or any of the co-polymers mentioned above.

The process is not limited to bonding vinylidene chloride polymeric products to plane metal surfaces but may be applied with equal success to the coating or lining of shaped articles, the die employed being adapted as to shape to the particular article desired.

Where composite laminated articles are to be made, the outer or surface layer of polymeric or co-polymeric vinylidene chloride may contain pigments, fillers, aluminum flake, or similar surface-effect materials to produce decorative articles. Such agents may be incorporated in the polymer prior to its being formed into a sheet or, if desired, they may be incorporated in the polymer while the latter is in a thermoplastic condition in the die press during the bonding operation.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. A coating composition comprising a polymeric derivative of vinylidene chloride and sufficient of a non-thermoplastic fibrous material, incorporated therein to provide a composition capable of producing permanent adhesion between a vinylidene chloride polymer and a clean metal surface.

2. A coating composition comprising a polymeric derivative of vinylidene chloride and between about 0.05 and about 2.0 parts by weight of a non-thermoplastic fibrous material per part of such polymer, the said composition being capable of causing permanent adhesion between a vinylidene chloride polymer and a clean metal surface.

3. A coating composition comprising a polymeric derivative of vinylidene chloride and sufficient asbestos fibers, incorporated therein to provide a composition capable of producing permanent adhesion between a vinylidene chloride polymer and a clean metal surface.

4. A coating composition comprising a polymeric derivative of vinylidene chloride and between about 0.05 and about 2.0 parts by weight of asbestos fibers per part of such polymer, the said composition being capable of causing permanent adhesion between a vinylidene chloride polymer and a clean metal surface.

ROBERT C. REINHARDT.